Patented July 4, 1939

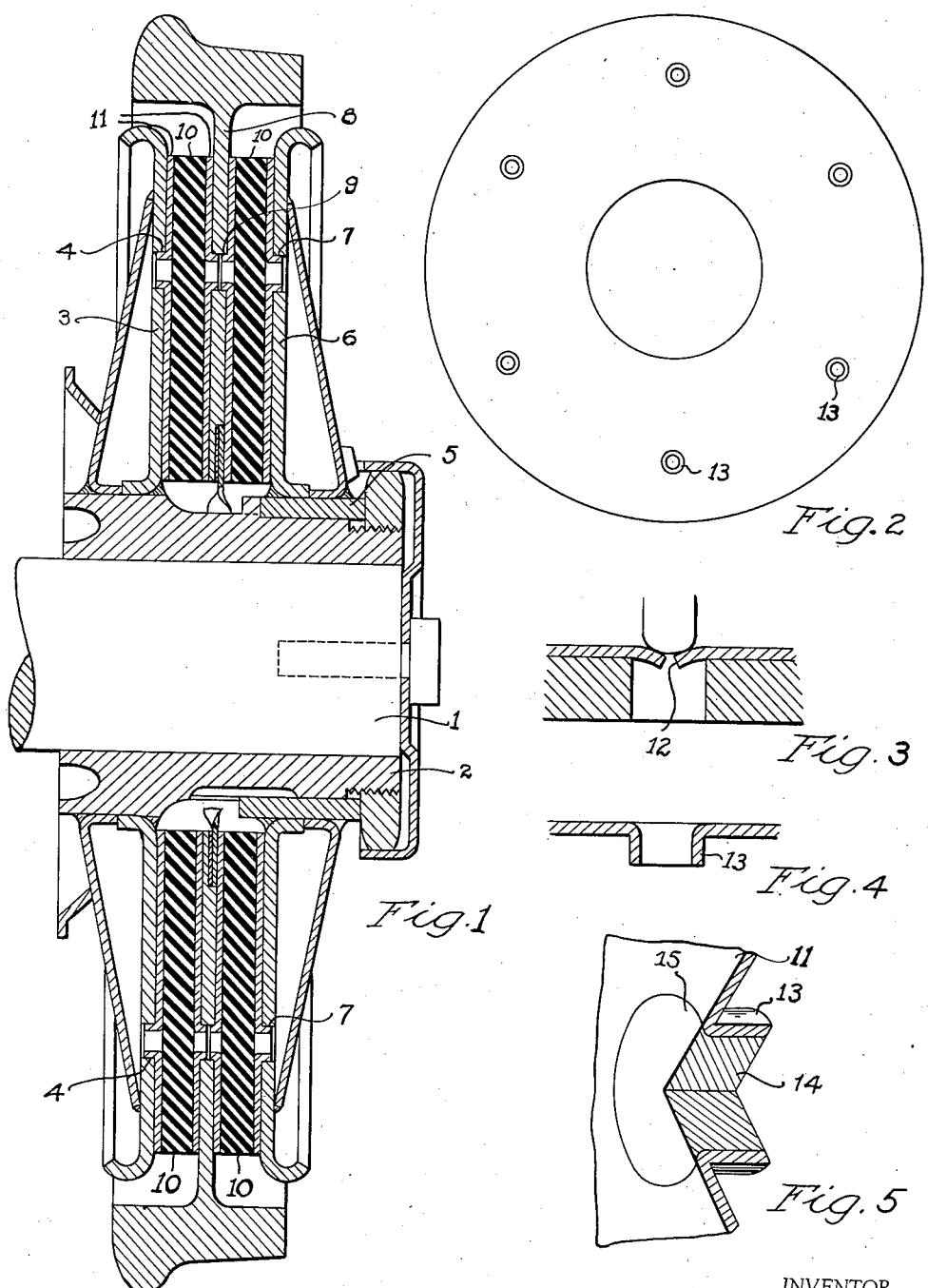

2,164,421

UNITED STATES PATENT OFFICE 2,164,421

METHOD OF MAKING SPRINGING ELEMENTS

Emil H. Piron, New York, N. Y., assignor to Transit Research Corporation, New York, N. Y., a corporation of New York Application July 15, 1936, Serial No. 90,693

3 Claims. (Cl. 29—159)

This invention relates to the method of making elastic springing elements particularly suited for such uses as resilient wheels wherein the hub is supported from the tire by elastic elements acting in shear and is a continuation in part of my application Serial No. 15,151 filed April 8, 1935.

Where elastic material such as rubber is called upon to transfer heavy loads in shear from one plate member to another the contact of the rubber with the plates presents the chief source of difficulty. If the rubber is bonded to the plates, the plates must be especially prepared as by cadmium coating and thereafter the rubber vulcanized thereto by equipment which a user cannot be expected to own. Thus if the plate members are heavy the expense of shipping back and forth to a rubber manufacturer is unduly great. It is therefore the object of this invention to provide a rubber element consisting of a slab or disc of rubber with thin metallic plates surface bonded to opposite faces thereof and adapted for attachment by dowels to the main load imposing and load receiving plate members.

The dowels for such attachment present difficulty in that they shear off or cause a buckling of the thin plates. It is therefore another object of this invention to teach the method of making the thin plates in such manner that they will withstand maximum loading and hence give satisfactory results for such installations as resilient wheels for rail vehicles.

More particularly it is an object to provide a method of forming dowels by punching holes in the thin plates, thereafter drawing the metal into hollow cylindrical projections, and in filling these projections with a plug which may be welded into place. The bottom of the plug may thereafter be coated with cadmium or other material along with the remainder of the plate which is to be surface bonded to the rubber element.

Other objects and advantages will hereinafter become more fully apparent as reference is had to the accompanying drawing wherein my invention is illustrated and in which Figure 1 is a section through a rail wheel equipped with my improved springing elements.

Figure 2 is a plan view of a stiff disc ready for vulcanization to an elastic element.

Figure 3 is a fragmentary sectional view of a stiff disc in the act of being punched.

Figure 4 is a view of the fragment of Figure 3 after punching, and

Figure 5 is a perspective view of a fragment section showing a completed dowel formation.

More particularly, 1 indicates an axle having a wheel hub 2 mounted thereon. A radial plate 3 is fixedly secured to the hub 2 and provided with a multiplicity of dowel holes 4. Encircling the hub 2 is a collar or sleeve 5 to which is fixedly secured a second radial plate 6 having dowel holes 7 identical with the holes 4, this plate 6 being substantially spaced from the plate 3. Between these two plates is a tire carrying plate 8 having a tire at its outer periphery and terminating at a substantial distance from the hub. This plate 8 has dowel holes 9 which extend, preferably, entirely through the longitudinal thickness thereof. Separating the plate 8 from the plates 3 and 6 are the springing elements each comprising a disc or slab of elastic material 10 surface bonded on each flat face to a stiff disc 11 of metal.

The discs 11 are each pierced as indicated at 12 and placed in a punch or other suitable machine where a multiplicity of hollow projections 13 are formed, these projections being equal in number for any disc to the number of dowel holes 4, 7 or 9. The discs 11 may thereupon be surface bonded to the elastic elements 10 and thereupon used as dowels, as illustrated in Figure 1, or they may be filled with a plug 14 for strength. These plugs 14 are cylindrical in shape but with their inner ends flared at 15 to completely fill the interior of the projection 15. The plug may then be welded in place with its inner end flush with the inside surface of the disc 11. When the plug 15 is used, the elastic material may be surface bonded to it as well as to the disc 11.

What I claim is:

1. The method of making a springing element for a resilient wheel wherein a tire is supported by an elastic means in shear, which consists in forming a plurality of holes through a pair of stiff plate members in symmetrically spaced relation about the intended axis of rotation thereof, in drawing the metal about and of said holes into cylindrical projections normal at their exterior surfaces to the surfaces of said plates, in completely filling said projections with metal flush with the exterior surfaces of said plates, and in surface bonding said plates to each side of flat circular masses of elastic material, said material being uniformly distributed about said intended axis of rotation.

2. The method of making a springing element for a spring device adapted for shear loading which consists in forming a plurality of openings in a pair of metallic plate members, in drawing the metal about said openings to form hollow cylindrical projections for use as dowel means, in filling said projections with metal and permanently securing the metal therein to reinforce the projections against collapse, and in surface bonding said members and said plugs one to each side of a slab of rubber with said projections extending outwardly from the rubber at opposite faces thereof.

3. The method of making a springing element for a spring device adapted for shear loading which consists in forming a plurality of openings in a pair of metallic plate members, in drawing the metal about said openings into hollow cylindrical projections forming practically a right angle bend with the outer surface of their plate members and forming a substantial arc with the inner surface of their said members, in filling said hollow projections with metal having a base portion following said arc, in permanently securing said metal in the projections to reinforce the projections, and in surface bonding said plate members into the base portion of said plugs one to each side of a slab of elastic material.

EMIL H. PIRON.